(12) United States Patent
Lehaff et al.

(10) Patent No.: US 7,400,879 B2
(45) Date of Patent: Jul. 15, 2008

(54) METHOD FOR CONDUCTING MOBILE COMMUNICATIONS FOR A NETWORK

(75) Inventors: Samir G. Lehaff, Portola Valley, CA (US); Jens Ulrik Skakkebaek, Mountain View, CA (US)

(73) Assignee: Adomo, Inc., Cupertino, CA (US)

( * ) Notice: Subject to any disclaimer, the term of this patent is extended or adjusted under 35 U.S.C. 154(b) by 188 days.

(21) Appl. No.: 10/087,713

(22) Filed: Mar. 1, 2002

(65) Prior Publication Data

US 2002/0123342 A1    Sep. 5, 2002

Related U.S. Application Data

(60) Provisional application No. 60/273,387, filed on Mar. 4, 2001.

(51) Int. Cl.
*H04Q 7/22* (2006.01)

(52) U.S. Cl. .............. 455/412.1; 455/413; 455/414.2; 455/417; 455/426.2; 455/461; 379/88.04; 379/88.18; 379/265.09; 379/266.01; 379/265.01; 709/206; 709/207; 709/219; 709/229

(58) Field of Classification Search .............. 455/414.1, 455/414.3, 556.1–556.2, 426.1–426.2, 3, 455/412.1–412.2, 413, 417, 461; 370/401, 370/354; 379/88.17–18, 265.09; 713/153, 713/162; 709/206–207, 248
See application file for complete search history.

(56) References Cited

U.S. PATENT DOCUMENTS

| | | | |
|---|---|---|---|
| 5,029,199 A | | 7/1991 | Jones et al. |
| 5,568,540 A | | 10/1996 | Greco et al. |
| 5,572,578 A | | 11/1996 | Lin et al. |
| 5,675,507 A | * | 10/1997 | Bobo, II ............ 709/206 |
| 5,703,942 A | | 12/1997 | Pinard et al. |
| 5,742,668 A | | 4/1998 | Pepe et al. |
| 5,742,905 A | * | 4/1998 | Pepe et al. ............ 455/461 |
| 5,778,390 A | | 7/1998 | Nelson et al. |
| 5,845,203 A | * | 12/1998 | LaDue ............ 455/414.1 |
| 5,884,032 A | * | 3/1999 | Bateman et al. ............ 709/204 |
| 5,909,483 A | | 6/1999 | Weare et al. |
| 5,995,596 A | | 11/1999 | Shaffer et al. |

(Continued)

OTHER PUBLICATIONS

CMP Media LLC, "Adomo Launches Mobile Communications Server," Computer Telephony, Apr. 2001.

(Continued)

*Primary Examiner*—Sharad Rampuria
(74) *Attorney, Agent, or Firm*—Central Coast Patent Agency, Inc.

(57) ABSTRACT

A method for facilitating incoming and outgoing calls in a mobile communication system using a server or software located on a third-party server is provided. An electronic attendant allows users to perform various tasks using one or more speech terminals coupled to the server through a public and private communications network. The method also provides for access to a corporate information system ("CIS") using the one or more speech terminals. The server recognizes both voice and digital signals from the speech terminals. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

79 Claims, 4 Drawing Sheets

U.S. PATENT DOCUMENTS

| | | | |
|---|---|---|---|
| 6,002,760 A * | 12/1999 | Gisby | 379/266.01 |
| 6,021,181 A * | 2/2000 | Miner et al. | 379/88.23 |
| 6,047,053 A * | 4/2000 | Miner et al. | 379/201.01 |
| 6,070,081 A * | 5/2000 | Takahashi et al. | 455/463 |
| 6,076,090 A | 6/2000 | Burroughs et al. | |
| 6,085,231 A | 7/2000 | Agraharam et al. | |
| 6,163,794 A * | 12/2000 | Lange et al. | 709/202 |
| H1941 H * | 2/2001 | Hoffpauir et al. | 379/265.13 |
| 6,219,694 B1 * | 4/2001 | Lazaridis et al. | 709/206 |
| 6,233,318 B1 | 5/2001 | Picard et al. | |
| 6,253,206 B1 | 6/2001 | Burton et al. | |
| 6,259,786 B1 * | 7/2001 | Gisby | 379/266.01 |
| 6,304,636 B1 | 10/2001 | Goldberg et al. | |
| 6,317,485 B1 | 11/2001 | Homan et al. | |
| 6,324,265 B1 * | 11/2001 | Christie et al. | 379/88.23 |
| 6,389,276 B1 | 5/2002 | Brilla et al. | |
| 6,396,908 B1 | 5/2002 | O'Donovan et al. | |
| 6,405,035 B1 * | 6/2002 | Singh | 455/414.1 |
| 6,411,685 B1 | 6/2002 | O'Neal | |
| 6,493,431 B1 | 12/2002 | Troen-Krasnow et al. | |
| 6,519,327 B1 | 2/2003 | Cannon et al. | |
| 6,519,571 B1 | 2/2003 | Guheen et al. | |
| 6,526,274 B1 * | 2/2003 | Fickes et al. | 455/414.1 |
| 6,549,612 B2 | 4/2003 | Gifford et al. | |
| 6,553,563 B2 | 4/2003 | Ambrose et al. | |
| 6,618,763 B1 * | 9/2003 | Steinberg | 709/246 |
| 6,633,630 B1 * | 10/2003 | Owens et al. | 379/93.24 |
| 6,671,800 B1 | 12/2003 | McInally et al. | |
| 6,714,778 B2 * | 3/2004 | Nykanen et al. | 455/414.1 |
| 6,731,927 B1 * | 5/2004 | Stern et al. | 455/414.1 |
| 6,785,380 B2 * | 8/2004 | Ribera | 379/265.09 |
| 6,853,714 B2 | 2/2005 | Liljestrand et al. | |
| 6,871,346 B1 | 3/2005 | Kumbalimutt et al. | |
| 6,947,989 B2 | 9/2005 | Gullotta et al. | |
| 6,950,990 B2 | 9/2005 | Rajarajan et al. | |
| 7,072,934 B2 | 7/2006 | Helgeson et al. | |
| 7,082,469 B2 | 7/2006 | Gold et al. | |
| 7,106,850 B2 * | 9/2006 | Campbell et al. | 379/265.09 |
| 7,151,823 B2 | 12/2006 | Durkin | |
| 7,167,550 B2 | 1/2007 | Klos et al. | |
| 7,233,980 B1 * | 6/2007 | Holden et al. | 709/219 |
| 2002/0064149 A1 | 5/2002 | Elliott et al. | |
| 2002/0115454 A1 * | 8/2002 | Hardacker | 455/457 |
| 2002/0123331 A1 | 9/2002 | Lehaff et al. | |
| 2002/0143877 A1 | 10/2002 | Hackbarth et al. | |
| 2002/0147801 A1 | 10/2002 | Gullotta et al. | |
| 2002/0165986 A1 | 11/2002 | Tarnoff | |
| 2002/0169876 A1 | 11/2002 | Curie et al. | |
| 2003/0140112 A1 | 7/2003 | Ramachandran et al. | |
| 2003/0195934 A1 | 10/2003 | Peterson et al. | |
| 2003/0220975 A1 | 11/2003 | Malik | |
| 2004/0002325 A1 * | 1/2004 | Evans et al. | 455/414.1 |
| 2004/0044687 A1 | 3/2004 | Vachuska et al. | |
| 2004/0049696 A1 | 3/2004 | Baker et al. | |
| 2004/0064502 A1 | 4/2004 | Yellepeddy et al. | |
| 2004/0109544 A1 | 6/2004 | Didcock et al. | |
| 2004/0111702 A1 | 6/2004 | Chan | |
| 2004/0120480 A1 | 6/2004 | Didcock et al. | |
| 2004/0171381 A1 * | 9/2004 | Inselberg | 455/426.2 |
| 2004/0225525 A1 | 11/2004 | Weitzman | |
| 2004/0253956 A1 | 12/2004 | Collins | |
| 2004/0258231 A1 * | 12/2004 | Elsey et al. | 379/201.01 |
| 2005/0025297 A1 | 2/2005 | Finnigan | |
| 2005/0216421 A1 | 9/2005 | Barry et al. | |
| 2006/0059107 A1 | 3/2006 | Elmore et al. | |

OTHER PUBLICATIONS

Adomo AdomoMCS, undated brochure.

* cited by examiner

METHOD FOR CONDUCTING MOBILE COMMUNICATIONS FOR A NETWORK

CROSS-REFERENCE

This application claims the benefit of U.S. Provisional Application No. 60/273,387, filed Mar. 4, 2001, which is incorporated herein by reference in its entirety.

This application is related to copending patent application Ser. No. 10/087,587, filed Mar. 1, 2002, which is incorporated herein by reference in its entirety.

FIELD OF THE INVENTION

The present invention relates generally to a network based mobile communication system.

BACKGROUND

As electronic communications systems continue to advance, the need to tightly integrate these systems has also increased. Electronic mail (e-mail), voice mail, electronic organizers and date books, and local and wide area networks, are just a few of the communication technologies that are vital to the success of businesses and other organizations in the modern world. Many of these communication systems and services (e.g., e-mail, professional contacts, company databases and calendaring systems) are accessible only to users while at the office through a corporate infrastructure such as provided by Microsoft Exchange™. This tends to promote inefficiency because more people are conducting business while on the road or away from their offices (e.g., using wireless phones). Thus, the challenge to effectively coordinate communication among different devices (e.g., personal computers, mobile phones, Personal Digital Assistant's (PDA's), etc.) and over different communications media so that people genuinely have effective access to one another is taking on a growing importance.

Recently, the focus has been on trying to develop technology that provides users with greater functionality and access to other communications systems through their telephone. U.S. Pat. No. 6,047,053 entitled "Network based knowledge assistant" discloses a computer-implemented entity that assists a subscriber with his or her communications by carrying out tasks that are delegated to it. Although the electronic assistant can handle certain calls using a variety of different communication devices, one drawback of this type of system is it is unable to readily access corporate information systems, such as Microsoft Exchange™. In addition, it does not allow a user to perform more sophisticated communication tasks (e.g., compose e-mail messages by phone using text-to-speech recognition).

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

The present invention provides a mobile communication system and method of operation for a network. In the following description numerous specific details are set forth in order to provide a thorough understanding of the present invention. However, persons having ordinary skill in the computer arts will appreciate that many of these specific details may not be needed to practice the present invention.

Figure 1:
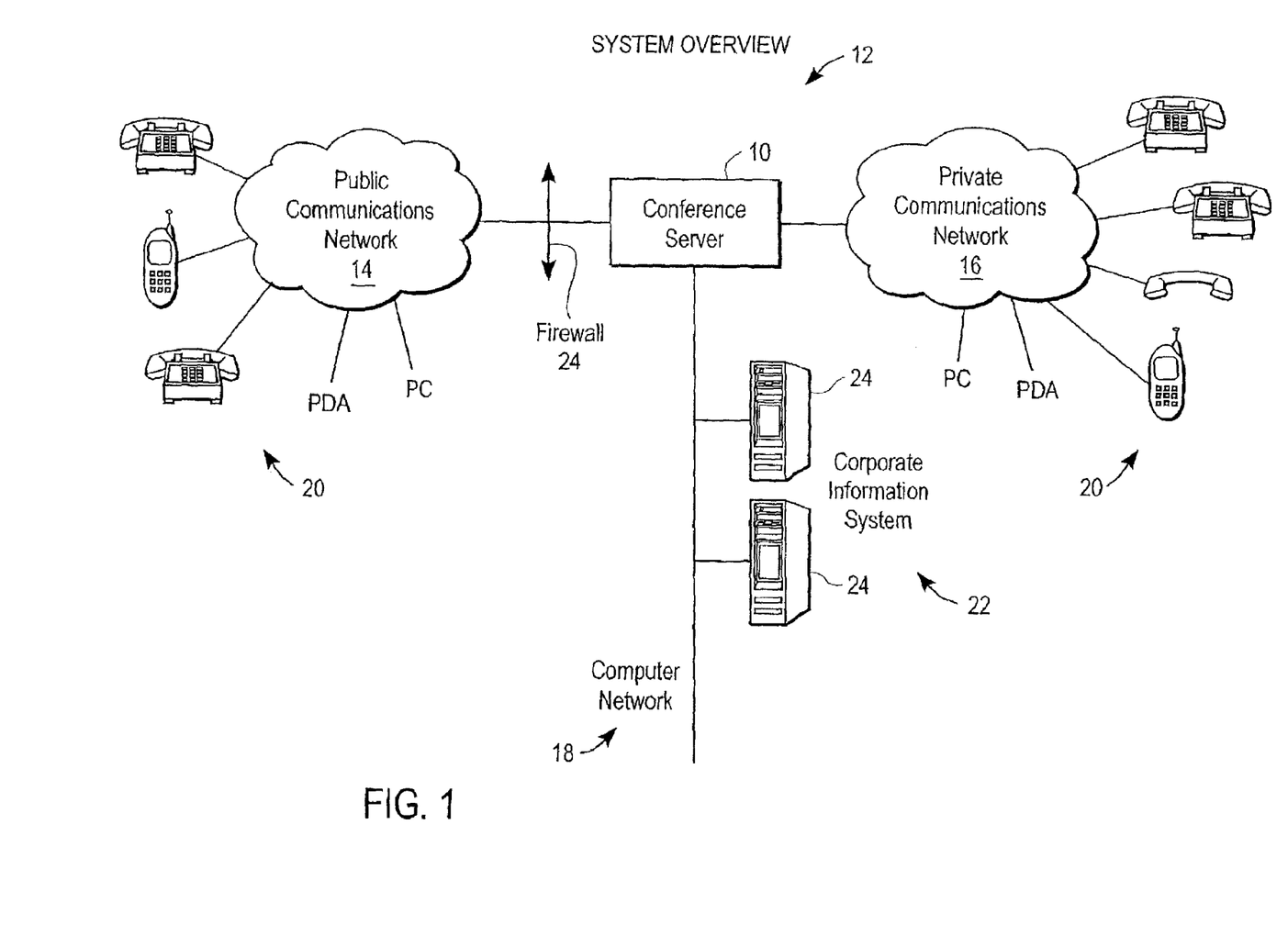
FIG. 1 is a block diagram of a communications infrastructure incorporating a mobile communication system according to one embodiment of the present invention.

As illustrated in FIG. 1, the mobile communication system 10 operates within a communications infrastructure 12. The mobile communication system 10 is a communication device with interfaces to a public communications network (public CN 14), a private communications network (private CN 16), and a computer network 18. In the embodiment illustrated by FIG. 1, a firewall 24 is used to separate the mobile communication system 10 from the public CN 14. It should be appreciated that the mobile communication system 10 may also interface with any other system of interconnections enabling two or more computers to exchange information as well (e.g., the Internet).

Mobile communication system 10 communicates with any number of speech terminals 20, (e.g., regular wired telephone and mobile phones), connected to the public CN 14 and also to any number of speech terminals 20 on the private CN 16. As those skilled in the telecommunications art will readily appreciate, the speech terminals 20 are not necessarily limited to speech. For example, the mobile communication system 10 may also communicate with any number of personal digital assistants (PDA's) 15 and personal computers 25. Since the speech terminals 20, the PDA's 15, and the personal computers 25 are electronic devices, they may incorporate circuitry to create and respond to electronic signals, such as conventional DTMF signals. It should be noted that the mobile communication system 10 also has an ability to work with speech in multiple languages (e.g., English, French, German, Italian, etc.).

The mobile communication system 10 may communicate via the computer network 18 with a corporate information system (CIS 22). The CIS 22 includes one or more corporate servers 24, such as servers for Microsoft Exchange™, Lotus Domino™, Customer Relationship Management (CRM), Field Force Automation (FFA), internal web sites, customized application servers, and database servers, such as Oracle™ servers. The servers may also continuously send information to the mobile communication system 10 via the computer network 18 and/or the Internet. Examples of continuous information include audio and video. These are labeled "corporate" here for convenience. The mobile communication system 10 may, of course, also be beneficially employed by other entities, like government agencies and non-commercial private organizations.

The mobile communication system 10 may communicate via the computer network 18 and the Internet to external servers and Internet sites. These servers and sites may be geographically located in or away from the company. These sites may include servers for Microsoft Exchange™, Lotus Domino™, Customer Relationship Management (CRM), Field Force Automation (FFA), internal websites, customized application servers, and database servers, such as Oracle™ servers. The servers may also continuously send information to the mobile communication system 10 via the computer network 18 and/or the Internet. Examples of continuous information include audio and video.

The mobile communication system 10 distributes incoming calls from the public CN 14 to the appropriate parties on a private CN 16, facilitates outbound calling from the private CN 16 to the appropriate parties on the public CN 14; and facilitates local calls between parties on the private CN 16. This server, shown here as mobile communication system 10, may also facilitate calls between parties on the public CN 14 only. For instance, an employee may call into the server from his cellular or home telephone and set up a conference call, solely with outside parties.

A call is a connection between two or more users, where a user may be a person using an electrical device (e.g., a speech terminal 20) or an unattended electrical device. For example, a call may be initiated by a person using a cellular telephone but received by an unattended voice mail system.

The public CN 14, the private CN 16, and the computer network 18 may all be distributed among multiple geographic locations.

The mobile communication system 10 is configured to allow one party to access another party using their name or some other form of identification. In one embodiment, the mobile communication system 10 dynamically associates a user with (at least one) particular speech terminal 20. To facilitate this feature, the concept of a login is employed. The association between a user and a speech terminal 20, PDA 15, or personal computer 25 is created when the user logs into the mobile communication system 10 from the speech terminal 20. The association between a user name and a particular speech terminal 20 is stored together with a user profile in the corporate information system (CIS 22). The CIS 22 stores this association until the user either logs out or logs in on another speech terminal 20. The association may be stored in memory, in a register, a latch, etc.

If a user moves to another location, the user is able to log in at any speech terminal 20 at the new location. This causes the mobile communication system 10 to change the association between the user name and a speech terminal 20 and to store this new association in the CIS 22.

Once the user is logged in, the mobile communication system 10 may recall the association between the user and speech terminal 20, so that the next time the user uses the same speech terminal 20, the mobile communication system 10 will have this association available. The mobile communication system 10 may use this association until a logout or a login on another speech terminal 20. However, the mobile communication system 10 will not necessarily allow access to sensitive data this way. In cases involving sensitive data, the mobile communication system 10 may require a login.

Independent of whether or not a user is logged in (if at all) to a speech terminal 20, the mobile communication system 10 may still allow any user to dial out from the speech terminal 20, using the publicly available directory information or by providing the mobile communication system 10 with one or more outside phone numbers.

To handle the necessary user data for all of this, the mobile communication system 10 is able to access all the information that is stored in the CIS 22, including contact information, address information, e-mails, calendar and task lists. This may be quite a considerable amount of data and data that is particularly powerful. For an example one need only contemplate the range of data already commonly stored in systems like Microsoft Exchange™. Traditionally, reaching a party has required knowing their telephone number, extension, etc. Now, using speech or keystrokes, a user's actual number, system user name, e-mail address, instant messaging identifier, phone number, extensions, etc., may all be used. Any manner by which the user is "known" or may be known to the CIS 22 is searchable.

Particular user information for use with the mobile communication system 10 may include password or PIN-codes, user preferences, alternate login-names, associations between users and speech terminals 20. These are stored together with a user profile on the CIS 22. For instance, using Microsoft Exchange™ this information is stored as "custom attributes." Other mechanisms, in Microsoft Exchange™ or in entire other frameworks, like Lotus Domino™, may also be used.

The mobile communication system 10 may use all parties that are defined in the CIS 22 as addressable parties. Typically, these are people/individuals, resources, and groups. The people or individuals are users of the system, as well as contact information on outside parties. The resources may include, for instance, meeting rooms, cars, office equipment, etc. And the groups are groupings of people and resources, (e.g., "marketing" or "sales").

As indicated by the previous examples, the mobile communication system 10 in general has the ability to provide a so-called multi-modal interface, where the user can interact with the mobile communication system 10 through any form of input and output, such as text input, speech recognition, text output, text-to-speech, graphics, recorded files and video. In such interfaces, the speech recognition and text-to-speech generation may partly take place in the speech terminal 20 and partly in the mobile communication system 10. For example, sound and/or video may be generated by the mobile communication system 10 by a continuous stream of sound and/or video data sent to the speech terminal 20. Such divided speech recognition is referred to as distributed speech recognition and is well known in the communication arts.

User-interaction with the mobile communication system 10 is particularly empowered. A user may command an attendant using spoken commands and keystrokes. For handling spoken commands the mobile communication system 10 incorporates speech recognition technology to interpret spoken commands, phrases, and sentences from the users. For handling keystroke commands the mobile communication system 10 interprets keystrokes from electronic devices in a conventional manner. For example, a user may call and request to have an e-mail read back to him from the CIS 22. The user may then request the mobile communication system 10 to respond to the e-mail message with a phone call. The mobile communication system 10 has the ability to search the CIS 22 for the correct phone number and make the call. In another example of user-interaction with the mobile communication system 10, a user can call the system and have the system update the user's calendar in the CIS 22. By way of example, the user can provide a voice command to the system using their office phone such as "I'll be out for lunch until 2:00 p.m." or "I've gone to a doctor's appointment, I'll be back by 3:00 p.m." The mobile communication system responds to the voice command by automatically updating the user's calendar in the CIS 22. When another person then calls for the user, the mobile communication system will automatically take a message, forward the call, send an e-mail message to the user regarding the phone call, or take other appropriate action.

The set of spoken commands and keystrokes that are accepted by the mobile communication system 10 may also change dynamically while a user is using the system, depending on what the users are doing and what their current needs and options may be. The user may specify, for example, directly as an explicit preference or implicitly by the nature of the speech terminal 20 currently being used, that a terse or verbose command mode be adopted. The mobile communication system 10 may also respond to the user by playing pre-recorded sound recordings or by on-the-fly translating of responses into sounds using text-to-speech technology. This may also be highly configurable or adaptive. For instance, the mobile communication system 10 may employ different "personalities" and it may also operate differently based on the nature of the speech terminal 20 currently being used by a particular user.

Figure 2A:
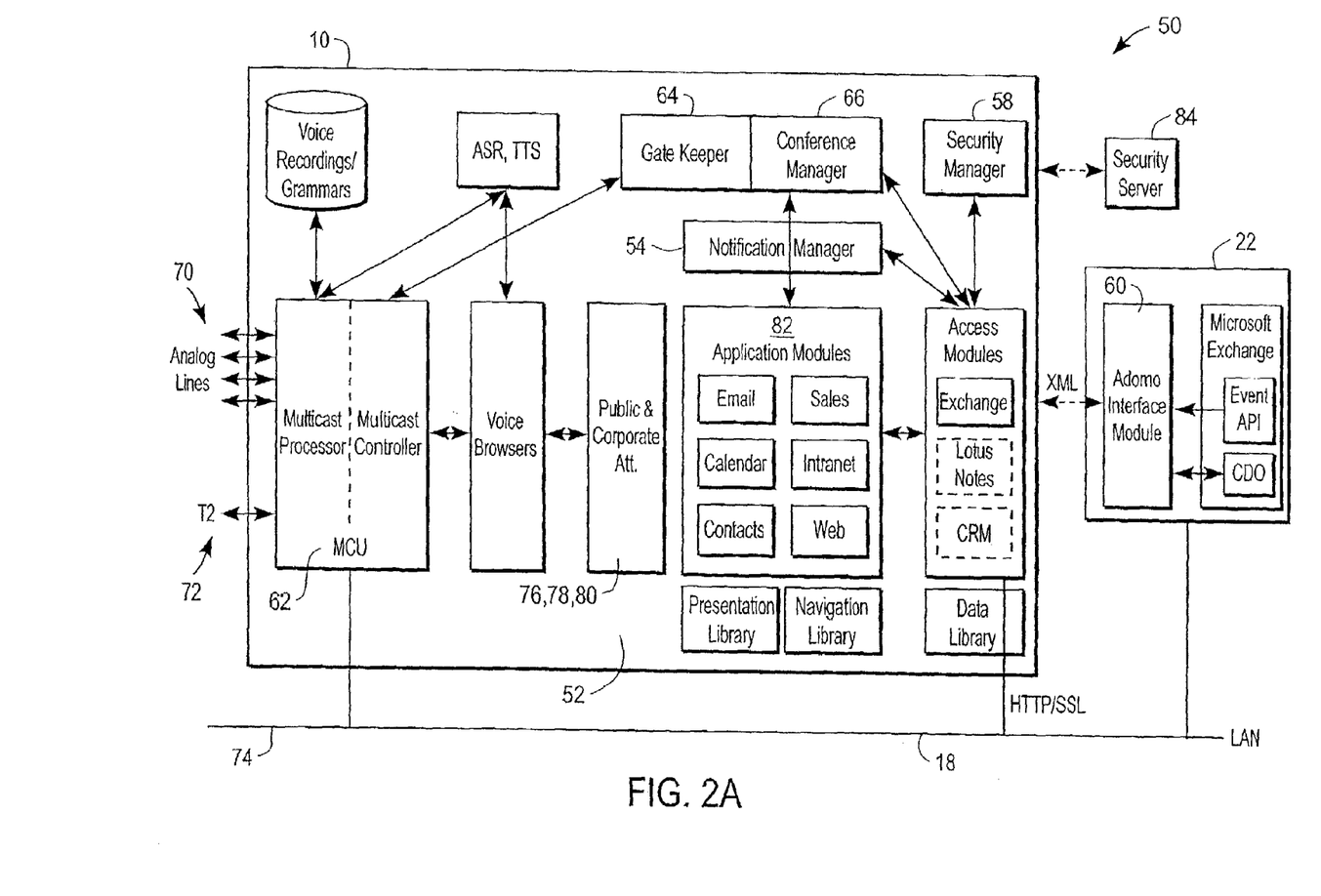
FIG. 2A is a block diagram of the system architecture of a mobile communication system according to one embodiment of the present invention.

As is shown in FIG. 2A, each incoming and outgoing call is handled by an attendant 76. There are two types of attendants, a public attendant 78 and a corporate attendant 80. The public attendant 78 handles incoming calls from users external to the corporation or other entity using the mobile communication system 10. This allows an external user to ask to be connected to any user that is registered in the CIS 22, and also to access a limited amount of information about the corporation.

In the first case, the mobile communication system 10 first requests the caller's identity and then attempts to locate the party being called. If the party is found, the connection is set up. If the party is not reached, the mobile communication system 10 asks the outside user to record a message. The mobile communication system 10 can store the message as a voice mail is easily done or translate the message and send it as an e-mail, Instant Message, or other message type, via the CIS 22.

The corporate attendant 80 gives particular employees of the corporation access to all people and all the information that is in the CIS 22, subject, if desired, to various security level permissions. The mobile communication system 10 prompts the user for their user name and passcode or PIN-code and then gives the user access to conferencing with all parties registered in the system, or access to all the information in the CIS 22 that the user normally has permission to access via other means.

The information in the CIS 22 that a logged in user may access includes, but is not limited to, e-mails, calendars, directory listings, personal contacts, corporate information (e.g., news, employee plans, etc.), content from the Internet, customer relationship management information, etc.

A conference is initiated by a user or may be initiated by the mobile communication system 10. The mobile communication system 10 may, using the information in the CIS 22, determine which of the users may be reached and where they may be reached. The mobile communication system 10 thereafter connects to the users and the conference is set up. All users in the conference may then communicate among themselves and also access the information in the CIS 22 during the conference.

New users may be added to an active conference session, by asking the mobile communication system 10 to conference in the user. Parties that were not reached in the initial set up for them may be notified and provided a conference ID. They are able to join the conference using this conference ID.

Parties may also be reached as members of ring groups and hunt groups. Ring groups are groups in the CIS 22. Hunt groups are also groups in the CIS 22, but with some added information on the order in which the members are to be contacted. This information is also stored in the CIS 22.

New conferences may also be initiated from other functions in the mobile communication system 10, such as while reading e-mails and looking at calendar entries. The mobile communication system 10 knows who the e-mail is from and who are the participants in a meeting, and the user can with a single command make the mobile communication system 10 call the sender or participants.

The mobile communication system 10 furthermore supports parking of conferences, transfer of conferences, day and night modes, and background music. For instance, the background music may be retrieved from the CIS 22 and played by the mobile communication system 10.

All messages recorded in the mobile communication system 10 are transferred to the CIS 22 and stored there. The messages may be attached to other parties in the CIS 22, such as e-mails and calendar entries.

The mobile communication system 10 monitors the information in the CIS 22 and is able to notify a user when certain changes happen or when a time exceeds some predefined time bounds. Examples of such state changes include incoming e-mails, incoming meeting requests, and rescheduling of meetings.

The mobile communication system 10 supports security measures such as PIN-codes, encrypted connection between the mobile communication system 10 and the CIS 22, speaker authentication based on user voice characteristics, and, generally, the whole spectrum of existing authentication servers used today, including authentication servers supporting dynamically changing PIN-codes.

From a user's perspective, they can simply access the mobile communication system 10 from any speech terminal 20. To make a call from the private CN 16 the user picks up a telephone handset, and the attendant 76 can identify itself immediately. The user can then place conference calls or access information in the CIS 22.

The attendant 76 is available at all times when the user is connected to the mobile communication system 10, and also during conference calls. The attendant 76 is thus able to act as a personal assistant, assisting the user with information access, setting up new conferences, and recording the conferences for later distribution. The attendant 76 can also be available to the leader of the conference only, or to all users of a conference. The user interface of the mobile communication system 10 is able to adapt to the user, such that the amount and kind of information passed to the user varies.

From a system administration perspective, no user specific information is necessarily stored in the mobile communication system 10. The mobile communication system 10 may, however, cache information from the CIS 22 to optimize performance. This provides the mobile communication system 10 with a number of benefits. Since it need not rely on user information databases of its own, there are no problems related to updating such. Similarly, a high degree of scalability is possible and is simplified because there are no problems or overhead associated with synchronizing user information databases among multiple mobile communication systems 10. Yet further, the security measures of the underlying CIS 22 may be relied on and not compromised. Still further, mechanisms for working with the user information will be present in the CIS 22 and will, presumably, already be known. Thus training is easy and operation is highly consistent. In sum, the underlying user information, and the solutions to the vexing problems of maintaining it, are already present in the CIS 22 and need not be duplicated.

A typical installation of the mobile communication system 10 is done in steps. First, certain network information is stored in the mobile communication system 10 by connecting to it from a speech terminal 20 and configuring it with the help of the attendant 76. Second, a software component is installed on the CIS 22 and the CIS 22 is configured to use that software component. This may include configuring accounts, changing permissions, and storing configuration information specific to the mobile communication system 10. Finally, the users are enabled in the mobile communication system 10.

Figure 2B:
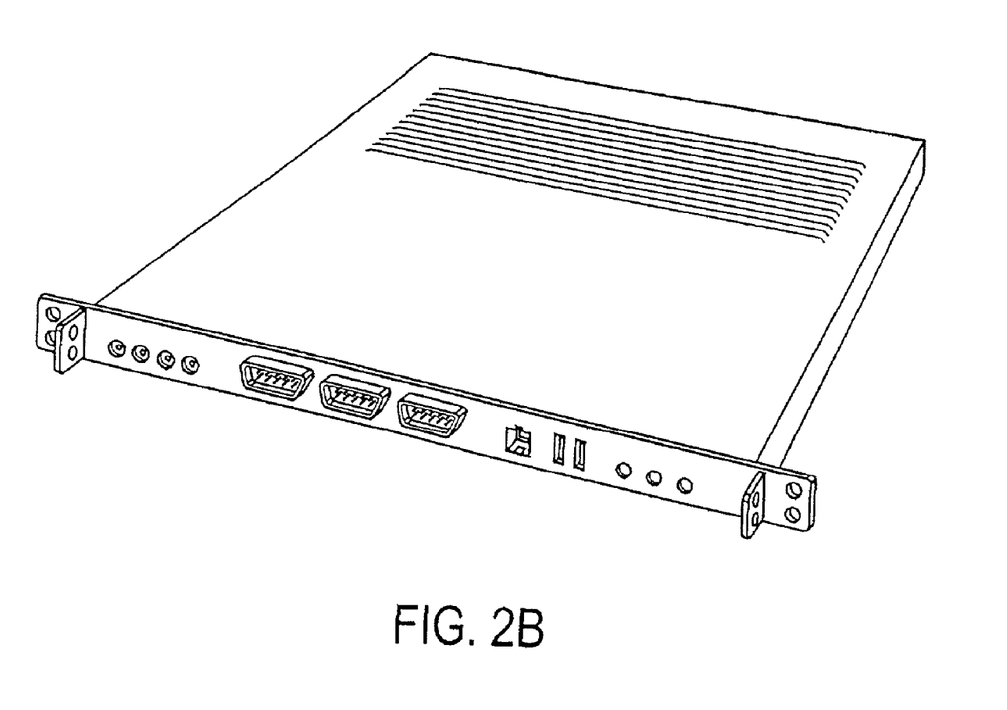
FIG. 2B is an illustration of the self-contained, "pizza-box" style server of a mobile communication system according to one embodiment of the present invention.

As touched upon above, the inventive mobile communication system 10 is highly scalable. The mobile communication system 10 is essentially an "appliance" because the system is self-contained. It is encased in a stackable, "pizza-box" style server 90 (FIG. 2B). Since all information may be stored in the CIS 22, multiple mobile communication systems 10 can run against the same CIS 22. This provides easy scalability, since an organization can add more mobile communication systems to expand capacity to meet increased demand.

The mobile communication system 10 may also serve multiple geographic locations. Multiple mobile communication systems 10 may be connected to the same private CN 16. In this configuration, a user can access the information in a CIS 22 from a mobile communication system 10 in a remote geographical location. The mobile communication system 10 relies on the directory information and mechanisms in the CIS 22 to forward the requests from the mobile communication system to the current repository.

All maintenance, including system status information of the mobile communication system 10 and upgrading can be performed from a computer anywhere on the computer network 18. Since all user-related information is stored with the user profile in the CIS 22, it is easy to move information from one corporate sever 24 in the CIS 22 to another.

Referring now to FIG. 2A there is shown a block diagram of the system architecture of a mobile communication system according to one embodiment of the present invention. The architecture 50 is modular and components may be swapped in and out, giving the flexibility to create several different configurations adapted to address different needs.

The main software components reside in the mobile communication system 10 and the CIS 22. In the mobile communication system 10, there is a dialogue engine 52, a notification manager 54, backend data access modules 56, and a security manager 58. In the CIS 22, one or more interface modules 60 are provided. In the embodiment illustrated by FIG. 2A, the first interface module 60 developed is for Microsoft Exchange™. Modules for other servers may be used as well, such as Lotus Domino™.

The mobile communication system 10 provides part of the telephony functionality and includes a multicast control unit (MCU 62), a gate keeper 64, and a conference manager 66. The MCU 62 performs multicast switching inside kernal software 68, (e.g., Linux™), running on a standard hardware platform with one or more CPUs. This may be performed via telephone line-cards, represented here by analog lines 70 and a T1 line 72, and a local area network (LAN 74) which is, in turn, part of the computer network 18.

In the exemplary embodiment, the conference manager 66 holds the intelligence for locating people (office, home, cell, etc.) using information from Exchange (our example) in the CIS 22. It also sets up conferences using Exchange groups, and manages these as they progress. Conferences may also be scheduled as a conference in the Exchange calendar; in this case, the conference manager 66 is notified when it is time for the conference and it initiates the conference.

The dialogue engine 52 generates the speech dialogue at run-time, based on all the information that is available, (e.g., the user's profile, the calendar, meeting requests, and time of day). The user-interface adapts to the user, based on their preferences and how fast they respond. Combined with the use of data caching techniques, such as pre-fetching of the next e-mail, this provides a very rapid response in the user interface.

The dialogue is generated by an attendant 76 (a module which includes both the public attendant 78 and the corporate attendant 80) and a number of application modules 82, (e.g., for e-mail, calendar, contacts, web, and intranet). Different products may contain a different subset of the modules, as particular needs and options dictate. More flexibility can be added, if needs change.

As noted, on the embodiment illustrated by FIG. 2A, two kinds of sub-attendant functionality are provided: the public attendant 78 and the corporate attendant 80. The former greets outside users and connects them to people inside the company, and the latter allows employees to access their corporate information (Exchange, CRM, etc.).

The notification manager 54 monitors the state of the backend information systems and initiates an action when certain events happen. Examples of events include the start of scheduled meetings, canceling of meetings, arrival of new e-mails, incoming calls and news flashes from the corporate intranet, etc. A user may request that the mobile communication system 10 places a call to the user, when such events occur. The mobile communication system 10 can also proactively assist customers. For example, if a user is in a meeting and a subsequent meeting is cancelled a voice mail message may be sent to the user's cell phone. Or a user may instruct the system that any e-mails from their supervisor or a key client are to be translated and sent as voice mail messages.

The backend access modules 56 pass requests from the dialogue engine 52 to the backend systems (e.g., Exchange in the CIS 22). New access modules may be added into the framework as new backend systems may be added (e.g., Lotus Domino™ and CRM).

The security manager 58 handles initial configuration of the mobile communication system 10, so that a secure connection is immediately established between the mobile communication system 10 and the backend corporate servers 24. Furthermore, it allows the mobile communication system 10 to connect to existing authentication servers in the corporate infrastructure, such as the security server 84 shown in FIG. 2A. The security manager 58 does not, however, have to remain active beyond initial configuration. As discussed above, once integrated into the system architecture 50, the mobile communication system 10 may or may not rely on the CIS 22 for general security needs.

To connect to the corporate information repositories on the corporate servers 24 in the CIS 22, the interface modules 60 are installed in the CIS 22. In one embodiment, interface module 60 is adapted for the widely used Microsoft Exchange™ product. The interface module 60 is a thin conversion layer that passes on requests from the mobile communication system 10 to Exchange and returns data in XML format. Furthermore, it registers with Exchange for certain events (e.g., arrival of urgent meeting requests) and forwards these to the notification manager 54.

The interface module 60 is non-intrusive in the CIS 22. Installation typically takes less than an hour and need not require the corporate server 24 running Exchange to be disabled or taken down. It should be noted that the system described herein may also be implemented in software such as Java, Perl, C++ or other types of software programming languages and can be stored in a computer readable medium (e.g., a disk).

Figure 3:
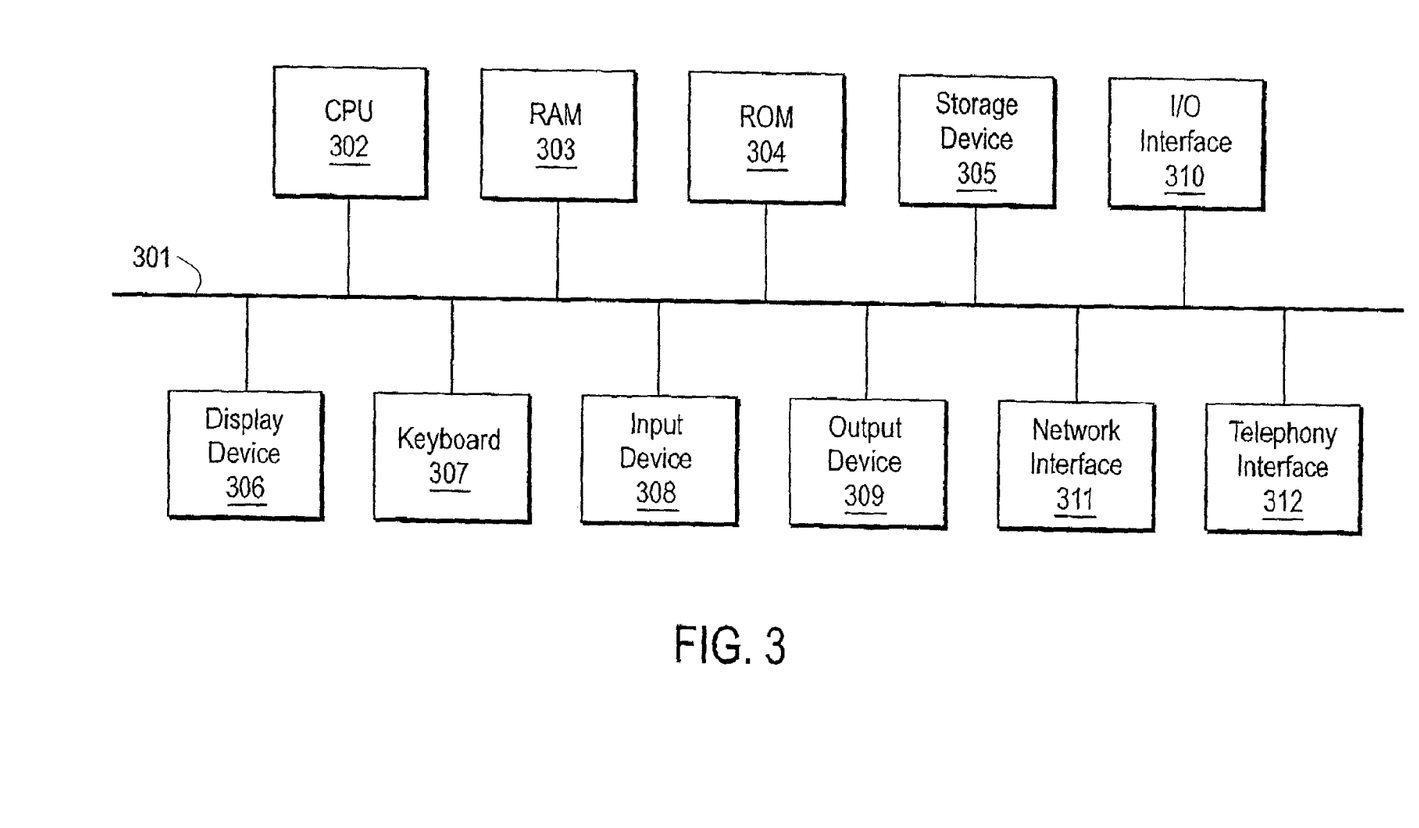
FIG. 3 illustrates an example of a computer system that implements one embodiment of the present invention.

Referring now to FIG. 3 there is shown an example of a computer system on which the present techniques may be implemented according to one embodiment of the present invention. The computer system 300 includes a processor 302 coupled through a bus 301 to a random access memory (RAM) 303, a read only memory (ROM) 304, and a mass storage device 305. Mass storage device 305 could be a disk or tape drive for storing data and instructions. A display device 306 for providing visual output is also coupled to processor 302 through bus 301. Keyboard 307 is coupled to bus 301 for communicating information and command selections to processor 302. Another type of user input device is cursor control unit 308, which may be a device such as a mouse or trackball, for communicating direction commands that control cursor movement on display 309. Many other input devices well known in the art may also be used. Further coupled to processor 302 through bus 301 is an input/output (I/O) interface 310 which can be used to control and transfer data to electronic devices connected to computer 300, such as other computers, tape records, and the like. The processor 302 may also be connected to a telephony interface 312 through bus 301. It should be noted that although display device 306, keyboard 307, and cursor control unit 308 may be included in the computer system 300, they are typically not essential for the computer system 300 to operate after the software has been installed.

Network interface device 311 is coupled to bus 301 and provides a physical and logical connection between computer system 300 and the network medium (not shown in this view). Depending on the network environment in which computer 300 is used, this connection is typically to a server computer, but it can also be to a network router to another client computer. Note that the architecture of FIG. 3 is provided only for purposes of illustration, and a client computer used in conjunction with the present invention is not limited to this specific architecture.

In the foregoing, a mobile communication system has been described. Although the present invention has been described with reference to specific exemplary embodiments, it should be understood that numerous changes in the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

What is claimed:

1. A method for conducting mobile communications, comprising:
   providing a communication server for a plurality of users, the server having an electronic attendant that greets users;
   an interface to a telecommunications network for speech communication; and an interface to a computer network;
   coupling the communication server to a corporate information system (CIS), the CIS including storage for corporate information including emails and servers including an email server;
   providing a plurality of speech terminals for a plurality of users, the speech terminals coupled to the communication server through at least one of the public telecommunications network or the private telecommunications network providing access to data in the CIS through voice or digital signals received in the communication server from the speech terminals;
   distributing calls to the speech terminals using the electronic attendant;
   asking outside users to record voicemail messages if the party being called is not reached;
   recording the voicemail messages in the communication server;
   transferring and storing all the recorded messages from the communication server to the CIS; and
   caching information from the CIS on the communication server, whereby the communication server does not rely on user information databases of its own.

2. The method of claim 1 wherein the voice signals are recognized through speech recognition technology.

3. The method of claim 1 wherein the server is a modular appliance.

4. The method of claim 1 wherein the telecommunications network comprises a public communications network and/or a private communications network.

5. The method of claim 4 further comprising distributing incoming calls from the public communications network to the private communications network.

6. The method of claim 4 further comprising distributing outgoing calls from the private communications network to the public communications network.

7. The method of claim 4 further comprising distributing incoming and outgoing calls to the private communications network.

8. The method of claim 4 further comprising distributing incoming and outgoing calls to the public communications network.

9. The method of claim 1 wherein the electronic attendant is comprised of a public attendant and a corporate attendant.

10. The method of claim 9 wherein the public attendant distributes calls from speech terminals external to the organization.

11. The method of claim 9 wherein the corporate attendant distributes calls from speech terminals internal to the organization.

12. The method of claim 1 wherein the speech terminals are attended devices.

13. The method of claim 1 wherein the speech terminals are unattended devices.

14. The method of claim 1 further comprising accessing one or more parties through a speech terminal using the e-mail address, phone number, or any other form, of identification for the one or more parties stored in the CIS.

15. The method of claim 1 wherein user authentication is required to access data in the CIS.

16. The method of claim 15 wherein the authentication comprises entering a code into a speech terminal.

17. The method of claim 15 wherein the authentication comprises a matching voice characteristic.

18. The method of claim 1 further comprising dynamically associating a user with a speech terminal using data stored in the CIS.

19. The method of claim 18 further comprising storing the association between the user and the speech terminal as a user profile, the CIS accessing the user profile every time the user logs on to the mobile communication system using the speech terminal.

20. The method of claim 1 further comprising updating the data in the CIS using a speech terminal by a user or other users registered in the CIS.

21. The method of claim 1 wherein the data includes contact information.

22. The method of claim 1 wherein the data includes e-mail messages.

23. The method of claim 1 wherein the data includes address information.

24. The method of claim 1 wherein the data includes calendar and task lists.

25. The method of claim 1 wherein the data includes directory lists.

26. The method of claim 1 wherein the data includes sales force automation information.

27. The method of claim 1 wherein the data includes field force automation.

28. The method of claim 1 wherein the data includes information related to an organization's employees.

29. The method of claim 28 wherein the data includes information from data repositories internal to the organization.

30. The method of claim 28 wherein the data includes information from data repositories external to the organization.

31. The method of claim 1 wherein the data includes information from databases and web sites on the Internet.

32. The method of claim 1 further comprising commanding the server to perform tasks using a speech terminal.

33. The method of claim 32 wherein the tasks include sending and receiving messages.

34. The method of claim 33 wherein the messages are e-mail messages.

35. The method of claim 32 wherein the tasks include forwarding calls.

36. The method of claim 32 wherein the tasks include conferencing with other pates using the speech terminals.

37. The method of claim 1 further comprising providing a set of responses to a speech terminal, the set of responses dynamically changing depending on the speech terminal.

38. The method of claim 37 wherein the set of the responses to the speech terminal includes a recorded message.

39. The method of claim 37 wherein the set of responses to the speech terminal is an on-the-fly translation of responses into sounds using text-to-speech technology.

40. The method of claim 1 wherein the speech terminals includes multi-modal interfaces.

41. The method of claim 40 wherein a user can input information to the server through the multi-modal interfaces using text, keystrokes, and speech recognition.

42. The method of claim 40 wherein the multi-modal interfaces present information to the server using a combination of sound, text, graphics, and video.

43. The method of claim 42 wherein the sound is generated by text-to-speech technology.

44. The method of claim 42 wherein the sound is generated by playing recorded files.

45. The method of claim 42 wherein the sound is generated by a continuous stream of sound data sent to the multi-modal interfaces.

46. The method of claim 42 wherein the video is generated by a continuous stream of video data sent to the multi-modal interfaces.

47. The method of claim 1 wherein the speech terminals include telephones.

48. The method of claim 1 wherein the speech terminals include personal digital assistants.

49. The method of claim 1 wherein the speech terminals include computers.

50. The method of claim 1 wherein the network is the Internet.

51. A method for conducting mobile communications, comprising:
providing a communication server for a plurality of users, the server coupled to a corporate information system (CIS) in an organization via a first network, the communication server including an interface to a telecommunications network for speech communication, and the CIS including storage for corporate information including emails and servers including an email server;
providing a plurality of speech terminals for a plurality of users, the speech terminals coupled to the server, the speech terminals accessing data in the CIS through voice or digital signals;
distributing calls to the speech terminals using an electronic attendant coupled to the server;
storing, on the CIS, a user profile with all user-related information for use with the communication server; and
accessing the user profile every time a user logs onto the mobile communication system using a speech terminal;
asking outside users to record voicemail messages if the party being called is not reached;
recording the voicemail messages in the communication server;
transferring and goring all the recorded messages from the communication server to the CIS; and
caching information from the CIS on the communication server, whereby the communication server does not rely on user information databases of its own.

52. The method of claim 51 further comprising dynamically associating a user with a speech terminal using data stored in the CIS.

53. The method of claim 51, wherein the user profile stores an association between the user and a speech terminal.

54. The method of claim 51, wherein the user profile stores a password.

55. The method of claim 51, wherein the user profile stores a PIN-code.

56. The method of claim 51, wherein the user profile stores a user preference.

57. The method of claim 51, wherein the user profile stores an alternate login name.

58. The method of claim 51, further comprising updating the data in the CIS using a speech terminal by a user or other users registered in the CIS.

59. The method of claim 51, wherein the data includes contact information, e-mail messages, address information, and calendar.

60. The method of claim 51, wherein the data includes information related to an organization's employees.

61. The method of claim 51, wherein the CIS accesses the user profile when the user logs on to the mobile communications system using a speech terminal.

62. A method for conducting mobile communications, comprising:
providing a server for a plurality of users, the server having an electronic attendant that greets users, an interface for speech communication and an interface to a telecommunications network, the server coupled to a corporate information system (CIS) in an organization, the CIS including storage for corporate information including emails and servers including an email server;
providing a plurality of speech terminals for a plurality of users, the speech terminals coupled to the server, the speech terminals accessing data in the CIS through voice or digital signals;
distributing calls to the speech terminals using the electronic attendant coupled to the server;
providing a set of speech responses to a speech terminal;
asking outside users to record voicemail messages if the party being called is not reached;
recording the voicemail messages in the communication server;
transferring and storing all the recorded messages from the communication server to the CIS; and caching information from the CIS on the communication server, whereby the communication server does not rely on user information databases of its own.

63. The method of claim 62, wherein the set of responses dynamically change depending on the speech terminal.

64. The method of claim 62, wherein the set of the responses to the speech terminal includes a recorded message.

65. The method of claim 62, wherein the set of responses to the speech terminal is an on-the-fly translation of responses into sounds using text-to-speech technology.

66. A method for conducting mobile communications, comprising:

provid­ing a server for a plurality of users, the server having an electronic attendant that greets users, an interface for speech communication and an interface to a telecommu­nications network, coupled to a corporate information system (CIS) in an organization, the CIS including stor­age for corporate information including emails and serv­ers including an email server;

providing a plurality of speech terminals for a plurality of users, the speech terminals coupled to the server, the speech terminals accessing data in the CIS through voice or digital signals;

distributing calls to the speech terminals using an elec­tronic attendant coupled to the server;

asking outside users to record voicemail messages if the party being called is not reached;

recording the voicemail messages in the communication server;

transferring and storing all the recorded messages from the communication server to the CIS; and caching information from the CIS on the communication server, whereby the communication server does not rely on user information databases of its own;

wherein the speech terminals include multi-modal interfaces.

67. The method of claim 66, wherein the multi-modal interfaces use at least two different forms of input from among text, keystrokes, or speech recognition.

68. The method of claim 66, wherein the multi-modal interfaces present information to the user using a combination of at least two different forms of output, the different forms of output including sound, text, graphics, or video.

69. The method of claim 68, wherein the sound is generated by text-to-speech technology.

70. The method of claim 68, wherein the sound is generated by playing recorded files.

71. The method of claim 68, wherein the sound is generated by a continuous stream of sound data sent to the multi-modal interfaces.

72. The method of claim 68, wherein the video is generated by a continuous stream of video data sent to the multi-modal interfaces.

73. A method for conducting mobile communications, comprising: providing a communication server for a plurality of users, the communication server having an electronic attendant that greets users, an interface for speech communi­cation and an interface to a telecommunications network, the server coupled to a corporate information system (CIS) in an organization, the CIS including storage for corporate infor­mation including emails and servers including an email server;

providing a plurality of speech terminals for a plurality of users, the speech terminals coupled to the server, and the speech terminals accessing data in the CIS through voice or digital signals;

connecting to the server from a speech terminal and con­figuring the server through the speech terminal and an electronic attendant;

installing a software component related to the server on the CIS and configuring the CIS to use the software compo­nent;

distributing calls to the speech terminals using the elec­tronic attendant coupled to the server through the first network;

asking outside users to record voicemail messages if the party being called is not reached;

recording the voicemail messages in the communication server;

transferring and storing all the recorded messages from the communication server to the CIS; and caching information from the CIS on the communication server, whereby the communication server does not rely on user information databases of its own.

74. The method of claim 73, wherein configuring the CTS to use the software component includes storing configuration information specific to the server.

75. The method of claim 73, wherein configuring the CIS to use the software component includes configuring accounts and changing permissions and storing configuration informa­tion specific to the server.

76. The method of claim 73, wherein the server comprises a modular appliance.

77. The method of claim 73, including caching information from the CIS on the server.

78. The method of claim 73, wherein the CIS uses the software component to configure accounts.

79. The method of claim 73, wherein the CIS uses the software component to change permissions.

* * * * *